H. A. TILDEN.
Filter.
No. 49,013.          Patented July 25, 1865.
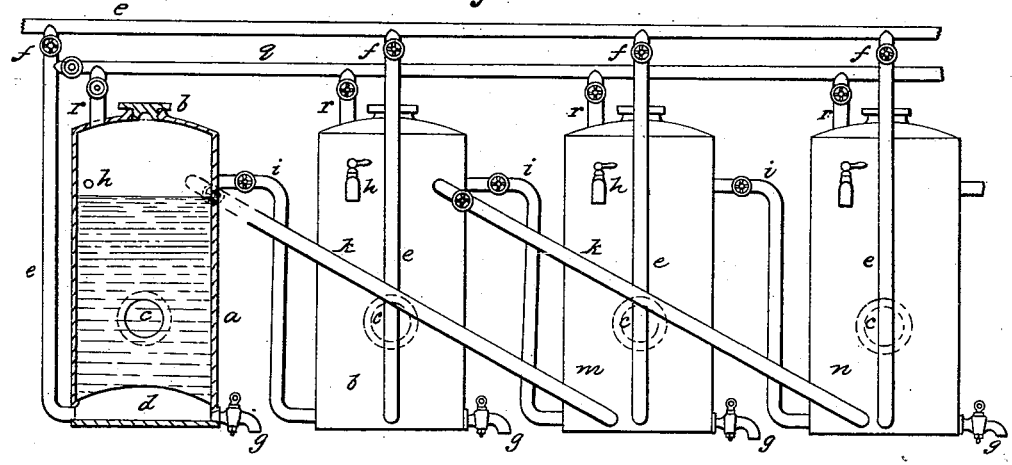
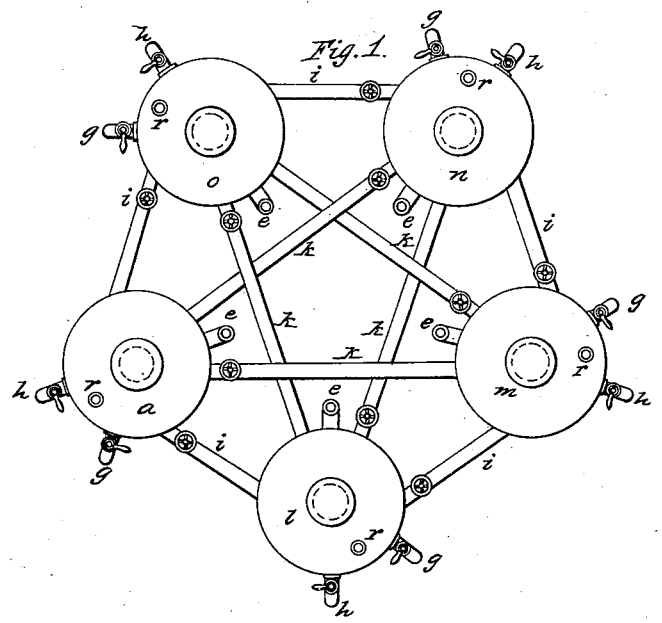
Witnesses:
Inventor:

UNITED STATES PATENT OFFICE.

HENRY A. TILDEN, OF NEW LEBANON, NEW YORK.

IMPROVEMENT IN APPARATUS FOR FILTERING SIRUPS AND OTHER LIQUIDS.

Specification forming part of Letters Patent No. 49,013, dated July 25, 1865.

*To all whom it may concern:*

Be it known that I, HENRY A. TILDEN, of New Lebanon, in the county of Columbia and State of New York, have invented, made, and applied to use a certain new and useful Improved Means for Filtering and Displacing; and I do hereby declare the following to be a full, clear, and exact description of the said invention, reference being had to the annexed drawings, making part of this specification, wherein—

Figure 1 is a plan of my filtering apparatus, and Fig. 2 is an elevation of four of such filters, one of them being shown in section.

Similar marks of reference denote the same parts.

The nature of my said invention consists in constructing a filter with a perforated diaphragm sustaining the animal-charcoal or other filtering medium or material, and with a pipe supplying the material to be filtered to the space below the said diaphragm, so that the filtration may be upward in order that impurities separated by such filter may subside into the said space and not rest upon and obstruct the filtering medium, a series of these filters being arranged in such a manner that the material filtered may be passed through two or more filters, according to the extent of filtration required, and that one filter at a time in the series may be excluded from the filtering operations for the purpose of cleaning or replenishing without checking the general operation.

This apparatus is also adapted to displacement, or the extraction of the properties of different substances by liquid passed through such substances.

In the drawings I have represented a series of these filters, one being shown in Fig. 2 in section. I will first describe one of these filters, as all are made alike, and then describe their joint action.

*a* is a vessel of suitable size, shape, and material. I prefer that it should be cylindrical and of metal, with a man-hole, *b*, at the top, and another, *c*, at the side.

*d* is a perforated diaphragm, which I prefer to be conical, supported at a little distance from the bottom, so as to leave a sediment-space below said diaphragm. The space above the diaphragm is to be filled to about the height shown with animal-charcoal or any other or desired filtering medium or other material.

*e* is a pipe descending from a suitable reservoir or vat containing the material to be filtered or the liquid, and *f* is a cock to regulate the flow of the same.

*g* is a cock to draw off sediment. *h* is a try-cock to examine the material after it passes up through the filtering medium, or to draw off when desired.

*i* is a pipe and cock leading from the upper part of the filter *a* to the lower part of the next filter, *l*, and *k* is another pipe and cock, leading to the lower part of the second filter, *m*, and so on from each filter to the adjacent ones. I have shown five of these filtering-vessels, *a*, *l*, *m*, *n*, and *o*, with the connections aforesaid.

*q* is a pipe that may be provided for supplying water for washing out one or more of the filters. It is to be fitted with cocks, so that the water can be directed through the pipe *e* and allowed to escape above from the cock *h*, or passed on through the series used for washing the same, or the water may be admitted from above the filtering medium by the pipe *r* and pass downward through the material and be drawn away by the cock *g*.

It will now be seen that the filtering operation may be continuous through the entire apparatus, or it may be stopped at any one of the vessels, the filtered material being allowed to run away by the cock *h*, and, when desired, any one filter may be excluded by closing the cock in the pipe *i* and opening the cock in the pipe *k*, so that the liquid passes to the second vessel instead of the one next to the one from which the liquid is flowing. The excluded filter may be washed out for removing sediment from the filtering medium, or that filtering medium may be removed from the man-hole *c* and fresh material afterward supplied through the man-hole *b*.

In consequence of the arrangement of pipes and cocks or valves shown the filtering operation may commence at any one of the vessels and terminate at any desired point, and the supply-pipes may also have branches, that may be used for supplying the same or different material to one or more filters in the series, so that such filters may be used in cases where the entire series is not required for one consecutive or continuous filtration.

This apparatus may be employed for making medicinal and other extracts by displacement. In this case the liquid is passed through the materials contained in the vessels and extracts their properties.

If desired, a steam coil or jacket may be employed within or around the lower part of these vessels to warm or heat the same to facilitate the operation performed in them.

What I claim, and desire to secure by Letters Patent, is—

1. A series of filtering-vessels, each formed substantially as specified, and connected from the upper part of one to the lower part of the next for effecting successive filtrations or displacements, as set forth.

2. A series of filtering-vessels in which the adjacent vessels are connected in the manner specified, so that one of them can be excluded from the filtering operation for the purposes specified.

In witness whereof I have hereunto set my signature this 28th day of March, A. D. 1865.

HENRY A. TILDEN.

Witnesses:
LEMUEL W. SERRELL,
CHAS. H. SMITH.